No. 788,780.

Patented May 2, 1905.

UNITED STATES PATENT OFFICE.

OTTO LIEBKNECHT, OF FRANKFORT-ON-THE-MAIN, GERMANY, ASSIGNOR TO ROESSLER & HASSLACHER CHEMICAL CO., OF NEW YORK, N. Y.

PROCESS OF MAKING PERBORATE.

SPECIFICATION forming part of Letters Patent No. 788,780, dated May 2, 1905.

Application filed September 2, 1904. Serial No. 223,134.

*To all whom it may concern:*

Be it known that I, OTTO LIEBKNECHT, a subject of the German Emperor, and a resident of Frankfort-on-the-Main, Germany, have invented certain new and useful Improvements in the Manufacture of Sodium Perborate, of which the following is a specification.

Tanatar (*Zeitschrift für Phys. Chemie*, Vol. 26, pages 132 to 134) was the first to produce hyperborates. In the manufacture of sodium perborate he started from borax which he treated in solution with a solution of peroxid of hydrogen and caustic soda. With twenty grams of borax Tanatar obtained fifteen grams of sodium perborate having the formula $NaBO_3 + 4aq$. In numerous experiments I have tried to obtain an amount of perborate corresponding to the statements of Tanatar; but the yield has always been greatly inferior to that expected. It is evident that the success of the operation depends on contingencies which Tanatar has not described and which render the application of his process very difficult. Apart from this the high cost of peroxid of hydrogen and the losses of boracic acid render Tanatar's process unprofitable, even if the correctness of Tanatar's statements be admitted. (See also Melikoff and Pissarjewsky, *Ber.* 1898, pages 678 and 953.)

According to the present invention sodium perborate is produced under conditions to render it of commercial value.

In carrying out this invention one molecular proportion of boracic acid, $B(OH)_3$, is stirred with cold water in a vessel. While the mixture is stirred, preferably by means of a helical stirrer, one molecular proportion of sodium peroxid is introduced, which is done quickly and without loss by the action of the helical stirrer, the sodium peroxid being at once incorporated in the mixture. As a temperature of 20° centigrade must not be exceeded, care must be taken to avoid a rise of temperature by providing suitable cooling arrangements. A thin liquid is thus obtained. An equivalent of an acid which forms an easily-soluble alkali salt is then added (such an acid, for example, may be either one molecular proportion of hydrochloric acid or one-half molecular proportion of sulfuric acid) while the mixture is still stirred, care being taken that the temperature does not exceed 20° centigrade, so that loss of active oxygen is prevented. External cooling will suffice to secure this result. When part of the acid has been added, the sodium perborate begins to separate out, and the separation is completed within from one to two hours after the final addition of the acid, the solution being kept at a temperature of about from 0° or 5° centigrade. The perborate settles at the bottom of the vessel as a heavy sandy powder. The salt lye above it is drawn off, and the crystal powder is, after removal of the moisture by suction or by a hydro-extractor, washed out with ice-water.

The sodium peroxid may be replaced by a mixture of potassium and sodium peroxid, such as is now obtainable in the trade. In this case an amount of caustic soda is added during the reaction proportional to the amount of potassium contained in the potassium and sodium peroxid and an excess of acid corresponding to the amount of caustic soda required, as potassium perborate appears to be considerably more soluble.

The method of procedure may be varied. For instance, the superoxids may be first introduced into the cooled water and then the boracic acid added.

The following example will further illustrate how this invention may be carried out in practice.

Example: Sixty kilograms of cold water and twenty-five kilograms of boracic acid, $B(OH)_3$, are well mixed in a vessel provided with a helical stirrer and 33.2 kilograms of ninety-four per cent. of sodium superoxid are introduced into the mixture. A rise of temperature above 20° centigrade is counteracted by internal and external cooling. After the introduction of the superoxid has been completed thirty-six liters of hydrochloric acid (specific gravity 1,185) are run into the mixture at such a rate that the temperature does not rise much above 20° centigrade, care being again taken to remove the heat generated. After about two hours the liquid which has been cooled down to from 0° to 5°—centigrade is allowed to settle. It is then decanted and the crystals are freed from moisture by suction or by the hydro-extractor. The crystals are then washed with ice-water (using from about thirty to forty liters) and dried at a temperature preferably less than 35° centigrade. In this way we obtain sixty kilograms of sodium perborate of great purity and containing ten per cent. of active oxygen.

According to the hereinbefore-described process a yield of ninety per cent. of active oxygen is obtained from the alkali superoxid employed. The yield is considerably less than this if no foreign acid is employed. If boracic acid and sodium superoxid are used alone, the yield is lower than the theoretical yield and the products obtained are of such low percentages that they cannot be used commercially. If one molecular proportion of superoxid and one molecular proportion of boracic acid be used, the caustic-soda lye formed retains so much perborate in solution that only sixty per cent. of the perborate is precipitated even when cooling to below 0° centigrade is resorted to and the liquor allowed to stand for some considerable time, the remainder of the perborate being lost. If two or more molecular proportions of boracic acid to one molecular proportion of superoxid be used, the metaborate formed in like manner retains some perborate in solution and the process is unprofitable on account of the regeneration of the boracic acid, and apart from this the product formed will be of low percentage.

I claim—

1. The herein-described process for the manufacture of sodium perborate which consists in causing molecular proportions of an alkali peroxid to react in the presence of water on boracic acid and an equivalent proportion of an acid that yields a readily-soluble salt, cooling the mixture and separating the precipitated perborate from the liquor.

2. The herein-described process for the manufacture of sodium perborate which consists in causing molecular proportions of sodium superoxid to react in the presence of water on boracic acid and an equivalent proportion of an acid that yields a readily-soluble alkali salt, cooling the mixture and separating the precipitated perborate from the liquor.

3. The herein-described process for the manufacture of sodium perborate which consists in causing molecular proportions of sodium superoxid to react in the presence of water on boracic acid and an equivalent proportion of sulfuric acid, cooling the mixture and separating the precipitated perborate from the liquor.

4. The herein-described process for the manufacture of sodium perborate which consists in causing molecular proportions of a compound containing sodium superoxid to react in the presence of water on boracic acid and an equivalent proportion of an acid that yields a readily-soluble alkali salt, cooling the mixture and separating the precipitated perborate from the liquor.

In testimony whereof I have signed my name to this specification in the presence of two subscribing witnesses.

OTTO LIEBKNECHT

Witnesses:
JEAN GRUND,
CARL GRUND.